United States Patent [19]

Hirata et al.

[11] Patent Number: 4,924,433
[45] Date of Patent: May 8, 1990

[54] WORD PROCESSOR WITH ATTRIBUTE FUNCTIONS

[75] Inventors: Keiichi Hirata, Kuwana; Yoshinari Morimoto, Nagoya; Tomohiro Ban, Iwakura; Tokihito Furushima, Nagoya; Tomoko Miura, Nagoya; Yoshie Ikeda, Nagoya; Yasushi Kawakami, Nagoya, all of Japan

[73] Assignee: Brother Kogyo Kabushiki Kaisha, Nagoya, Japan

[21] Appl. No.: 72,730

[22] Filed: Jul. 13, 1987

[30] Foreign Application Priority Data

Jul. 15, 1986 [JP] Japan .................................. 61-166219
Nov. 15, 1986 [JP] Japan .................................. 61-272665

[51] Int. Cl.$^5$ ................................................ G06F 3/14
[52] U.S. Cl. .................................. 364/900; 364/943; 364/943.1; 364/943.43; 340/709
[58] Field of Search ... 364/900 MS File, 200 MS File; 340/709, 711, 718, 723

[56] References Cited

U.S. PATENT DOCUMENTS 4,491,933 1/1985 Ursin et al. ......................... 364/900
4,495,490 1/1985 Hopper et al. ...................... 340/709
4,686,649 8/1987 Rush et al. .......................... 364/900
4,742,485 5/1988 Carlson et al. ...................... 364/900
4,806,916 2/1989 Raskin et al. ....................... 340/709

FOREIGN PATENT DOCUMENTS 0165442 5/1985 European Pat. Off. .

Primary Examiner—Gareth D. Shaw
Assistant Examiner—Debra A. Chun
Attorney, Agent, or Firm—Oliff & Berridge

[57] ABSTRACT

A word processor having attribute functions such as underline, boldface, superscript, etc., can produce or cancel those attribute effects on the display device by simple operations. The word processor with an attribute mode can either produce the attribute effect which is selected by an attribute key in response to the rightward or downward movement of the cursor, or cancel it in response to the leftward or upward movement. The word processor with an attribute cancel mode in addition to an attribute mode can set a mode among a non-attribute mode, an attribute mode and an attribute cancel mode independent of the direction of the cursor's movement.

15 Claims, 17 Drawing Sheets ( MOVE CURSOR TO THE RIGHT BY → KEY )

( MOVE CURSOR DOWN BY ↓ KEY )

( MOVE CURSOR TO THE LEFT BY ⬅ KEY )

```
 A  BCD  EF  GHIJKLMN
OPQ RST.  UVW  Xyz  A
bcd ef  gh i jklmn  op
q  rst.  UVW  xyz  a  b
cd.  efg  hijkl  mn  o
pq  rst  UVW.
```

Fig. 12B

```
 A  BCD  EF  GHIJKLMN
OPQ RST.  UVW  Xyz  A
bcd ef  ghijklmn  op
q  rst.  UVW  xyz  a  b
cd.  efg  hijkl  mn  o
pq  rst  UVW.
```

Fig. 12C

```
 A  BCD  EF  GHIJKLMN
OPQ RST.  UVW  Xyz  A
bcd ef  ghijklmn  op
q  rst.  UVW  xyz  a  b
cd.  efg  hijkl  mn  o
pq  rst  UVW.
```

WORD PROCESSOR WITH ATTRIBUTE FUNCTIONS

BACKGROUND OF THE INVENTION

The present invention relates to a word processor with an attribute function. Many word processors can create some attribute effects such as underline (A), boldface (B), superscript ($S^2$), subscript ($O_2$), strikeout (STOUT), and so on. It is known that some of the prior word processors determine a range by means of a cursor's movement and then select one of the attribute effects to be added or canceled throughout the determined range. It is also known that a prior word processor having an individual attribute key for each attribute effect executes the attribute effect in response to the cursor's movement when one of the attribute effect keys is depressed.

However, with respect to the above-mentioned word processor which sets the range before selecting the attribute effect, many keystrokes are required in order to execute attribute effects, resulting in a complicated operation. In particular, the process of operating the attribute functions is rather confusing for the beginner, discouraging him or her from learning the operation of the word processor.

In another prior word processor which has an individual attribute effect key for each attribute effect and creates the attribute effect in response to the cursor's movement, the direction of the cursor's movement is predetermined to be rightward and downward. As a result, when the attribute effects previously produced are required to be canceled, the operator has to follow a complicated process; that is, moving the cursor back to the top of the range where the attribute effects are required to be canceled, depressing the attribute cancel key prior to the attribute effect key, and finally moving the cursor rightward or downward so as to cancel the attribute effects. Furthermore, another problem with the above word processor is that the cursor's movement can produce an unwanted cancelation of a character; to elaborate, when the operator moves the cursor in order to produce an attribute effect within a range where some of the words are already provided with the attribute effect, the attribute effect already existing with the words is automatically canceled in response to the cursor's movement, while the words without the attribute effect are provided with the attribute effect.

SUMMARY OF THE INVENTION

It is accordingly an object of the present invention to provide a word processor with an attribute mode which can produce or cancel attribute effects according to the direction of the cursor's movement.

Another object of the present invention is to provide a word processor which has an attribute mode and an attribute cancel mode for producing and canceling attribute effects respectively.

An advantage of the present invention is that it provides a means of executing the attribute effects efficiently by simple operations on the keyboard.

The object of the invention is attained by a word processor with input means for inputting a character data, memory means for storing the character data from the input means, display means for displaying at least a part of the inputted character data, attribute selection means for selecting an attribute data, and control means responsive to the attribute selection means for adding the attribute data to the character data throughout a range of delimited by an initial point and a terminal point of a cursor's movement in a predetermined direction.

The object is also attained by a word processor with input means for inputting a character data, memory means for storing the character data from the input means, display means for displaying at least a part of the inputted character data, attribute selection means for selecting an attribute data, mode setting means for setting an attribute addition mode and/or an attribute cancel mode, and control means responsive to the mode setting means for adding the attribute data to the character data and/or canceling the attribute data therefrom within a range determined by an initial point and a terminal point of a cursor's movement.

BRIEF DESCRIPTION OF THE DRAWINGS

The present invention will be described in more detail with examples and reference to the accompanying drawings, in which:

FIGS. 8, 9, 10, 11, 12A, 12B and 12C illustrate processes of the attribute functions in the second embodiment.

DETAILED DESCRIPTION OF THE PREFERRED EMBODIMENTS

A word processor embodying the present invention will be described in detail hereinafter according to the drawings.

Figure 1:
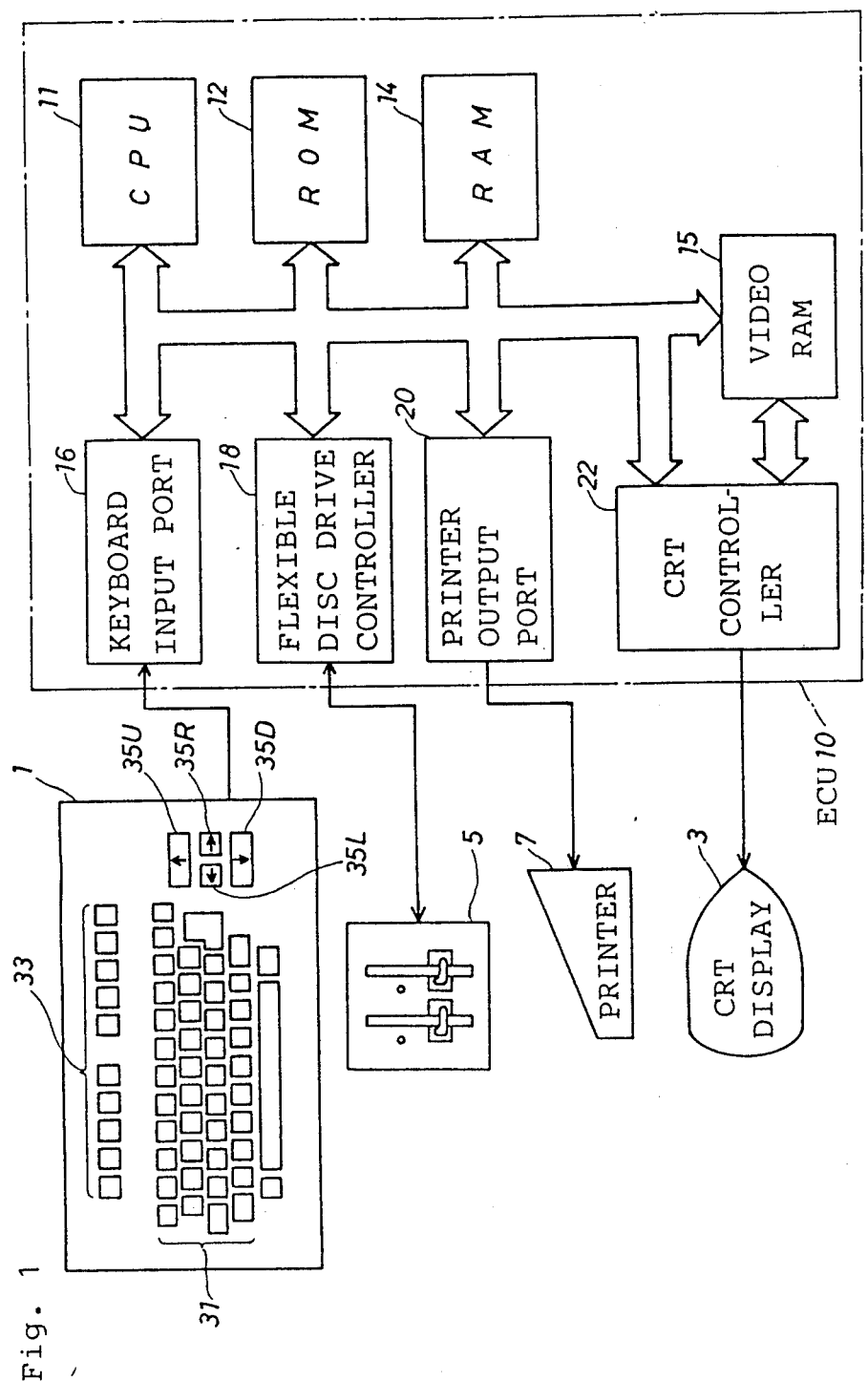
FIG. 1 is a schematic block diagram of a first embodiment of the invention.

Referring to FIG. 1, a generalized view of the word processor is shown. The word processor mainly comprises a keyboard 1 from which characters and editorial commands are input, a CRT display 3 for displaying characters or drawings, a flexible disc drive 5 for an external storage, a printer 7 for printing characters or drawings, and an electronic control unit (ECU) 10 connected to those devices mentioned above for controlling input, editing, and printing of the text. The ECU 10 mainly comprises a well-known CPU 11, a ROM 12 and a RAM 14. The ECU 10 also comprises a video RAM 15 for storing video data of characters or drawings to be displayed on the CRT display 3, a keyboard input port 16 for inputting key data from the keyboard 1, a flexible disk drive controller 18 for controlling the flexible disk drive 5 so as to read and write the input data, and a printer output port 20 for outputting printing data to the printer 7. The video RAM 15 with a dual port RAM system can access a CRT controller 22 which is provided independent of the CPU 11. The CRT controller 22 repeatedly reads the data from the video RAM 15 in a cycle determined by the scanning frequency of the CRT display 3 and displays those data on the CRT display 3. Therefore, the data written in an appropriate place in the video RAM 15 by the CPU 11 are displayed immediately on the CRT display 3.

The keyboard 1 comprises a number of character keys 31, attribute effect keys 33 for setting an attribute mode as well as selecting one effect among several attribute effects, and cursor keys 35R, 35L, 35U and 35D which move the cursor on the display rightward, leftward, upward, and downward respectively. The operator can enter text by striking the character keys 31, and produce or cancel attribute effects, such as underline, superscript, etc., on the text. The text input from the keyboard can be written in a flexible disk set in the flexible disk drive 5 via the flexible disk drive controller 18, or the text can be output to the printer 7.

With reference to the flowchart in FIG. 2, the process of producing or canceling the attribute effects on the text will be explained hereinafter. The English word processor of the present embodiment is designed to express one character by two bytes, namely, sixteen bits. Each of the upper eight bits is used as a flag indentifying an attribute effect. When one of the attribute effect keys 33 is depressed to select an attribute effect and to set the attribute mode, the rightward cursor key 35R and the downward cursor key 35D operate to produce the selected attribute effect; the leftward cursor key 35L and the upward cursor key 35U operate to cancel the selected attribute effect.

Figure 2:
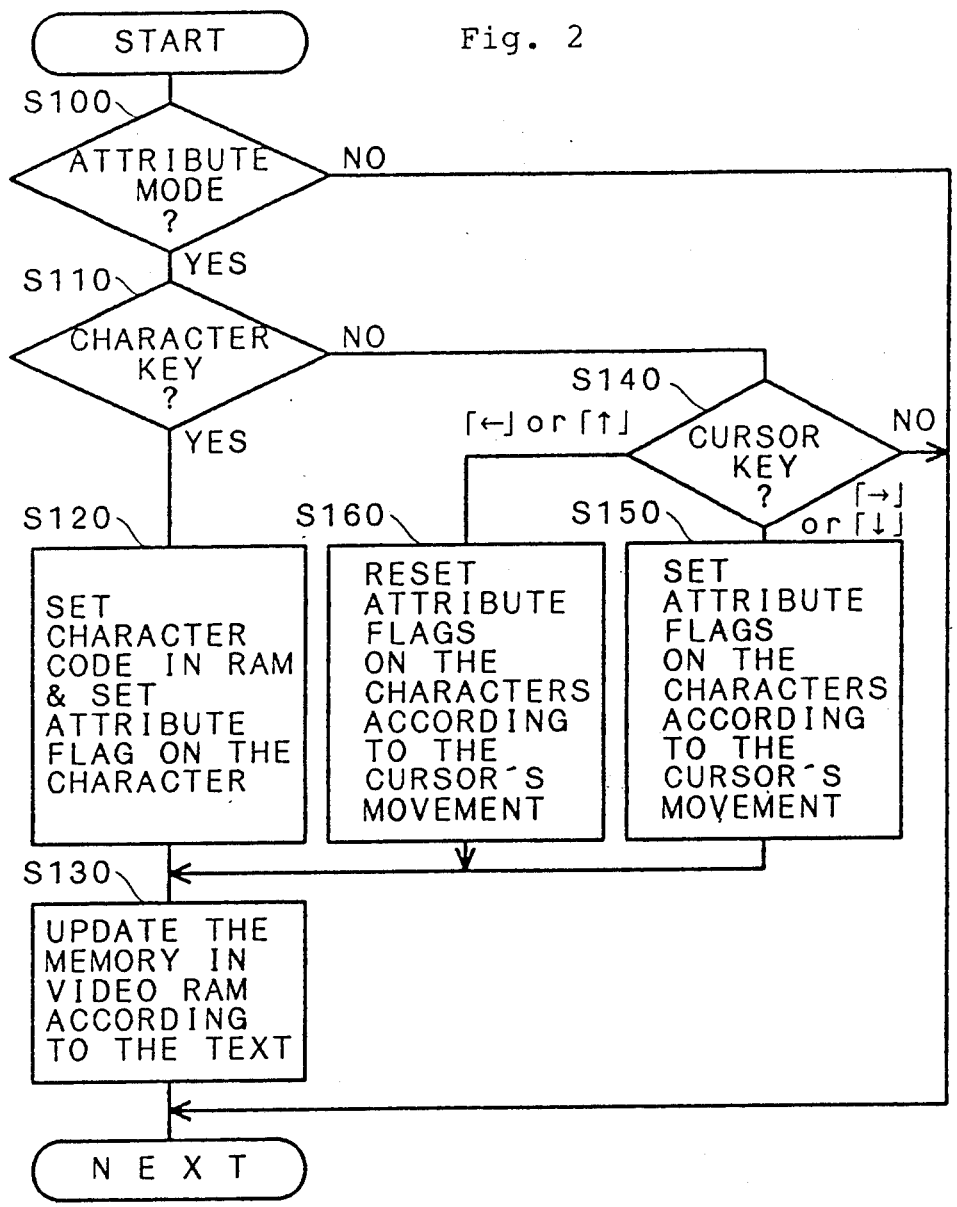
FIG. 2 is a flowchart of an attribute mode control routine of the first embodiment.

When the word processor receives a keystroke from the keyboard 1, the attribute mode control routine in FIG. 2 starts and a first decision is made at step 100 of whether the attribute mode is set or not. If at least one attribute effect key 33 has been depressed at this stage, it is determined YES and the program proceeds to step 110. If no attribute effect keys 33 are depressed, the program proceeds to "NEXT" and executes the text input routine (not shown).

When the attribute mode is "ON", a decision is made at step 110 of whether or not the keystroke was made on a character key. If this is so, a character code corresponding to the pressed character key is set on a predetermined location of the text area in the RAM 14 and an attribute flag is set on the character at step 120. Since each character code consists of two bytes and each of the upper eight bits thereof is used as a flag identifying an attribute effect, a bit corresponding to the selected attribute effect is set to 1 at step 120. The following table shows the correspondence between the bits and the attribute effects.

TABLE 1

| bit | type of attribute effect |
|---|---|
| $2^0$ | underline |
| $2^1$ | none |
| $2^2$ | boldface |
| $2^3$ | none |
| $2^4$ | strikeout |
| $2^5$ | superscript |
| $2^6$ | subscript |
| $2^7$ | none |

For example, if the underline effect is selected, the $2^0$ bit of the character code is set to 1 so as to set the underline flag at step 120. If both boldface and superscript effects are selected, the $2^2$ bit and the $2^5$ bit are set to 1 so as to set the boldface flag and the superscript flag respectively.

At the following step 130, the memory in the video RAM 15 is updated according to the contents of the text. Since the CRT display 3 employs the method of so-called bit map display, the video RAM 15 stores a word queue provided with the attribute effects according to the character codes stored in the text memory. As a result, the text is displayed on the CRT display 3 presenting images of the selected attribute effect provided on the characters. After the above process, the program proceeds to "NEXT" where the attribute mode control routine ends.

On the other hand, when the keystroke at the beginning of the routine was made on any key other than a character key, the answer at step 110 is NO and the next decision is made at step 140 of whether or not the keystroke was made on a cursor key. If it is NO at step 140, it means that the keystroke was made not on any character key or cursor key but on some other function key, such as a carriage return key or a tab key. In this case, the program jumps to "NEXT" to end the routine.

When the keystroke was made on either of the rightward cursor key 35R and the downward cursor key 35D, an attribute flag is set on every character within a range between an initial point of the cursor and a terminal point thereof at step 150. Thereafter, the program proceeds to step 130 for displaying the text with the attribute effects.

Figure 3A:
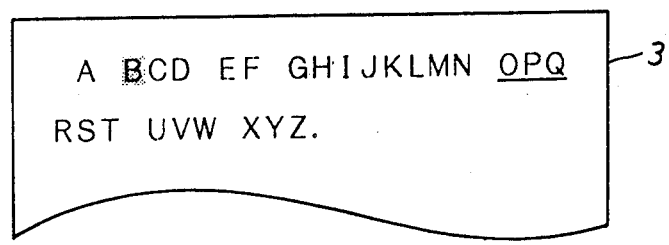
FIGS. 3A, 3B and 3C illustrate a process of producing an underline.
Figure 3B:
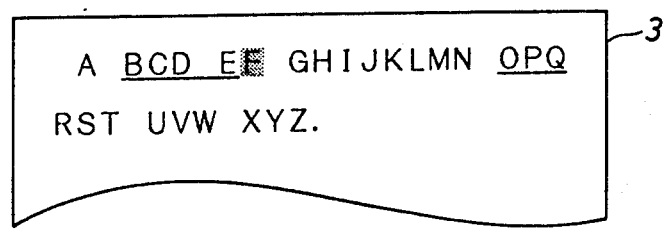
Figure 3C:
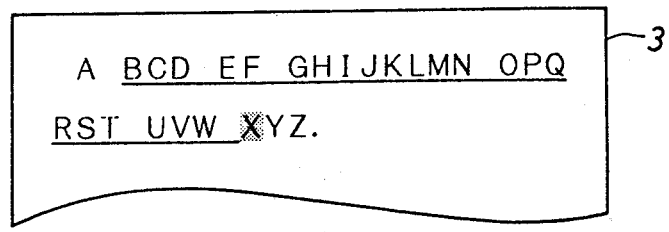

With reference to FIGS. 3A, 3B and 3C, the above-stated process for displaying the attribute effect, i.e., underline in this example, will be explained more in detail. In FIG. 3A, the attribute mode is set for underlining and the cursor is located on the letter "B". The operator moves the cursor by the rightward cursor key 35R to the letter "F" so that the underline is displayed within a range passed by the cursor as shown in FIG. 3B. Then, the operator moves the cursor down one position from the letter "F" on the first line to the letter "X" on the second line so that the underline is displayed within a range between the initial point and the terminal point of the cursor as shown in FIG. 3C. According to the present embodiment, neither the rightward nor downward movement of the cursor affects the attribute flags which have been previously set. Therefore, those preset attribute flags remain even after the cursor passes through them, and thus the attribute effect is produced for every character and space uniformly within a range determined by the cursor's movement, as illustrated by the letters "OPQ" in FIGS. 3B and 3C.

When the keystroke at the beginning of the routine was made on either the leftward cursor key 35L or the upward cursor key 35U, the attribute flags are reset on every character within a range between the initial point and the terminal point of the cursor at step 160, and the attribute effects are accordingly canceled on the CRT display 3 at step 130.

Figure 4A:
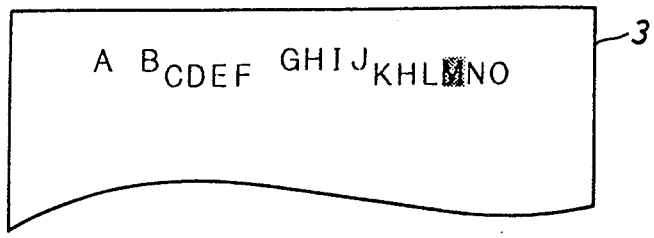
FIGS. 4A and 4B illustrate a process of canceling subscript.
Figure 4B:
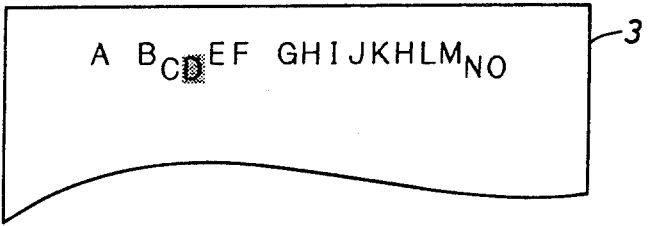
Figure 5A:
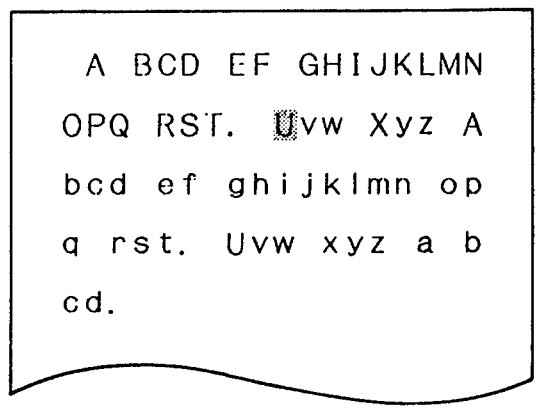
FIGS. 5A, 5B, 5C and 5D illustrate a process of producing an underline in a wide range.
Figure 5B:
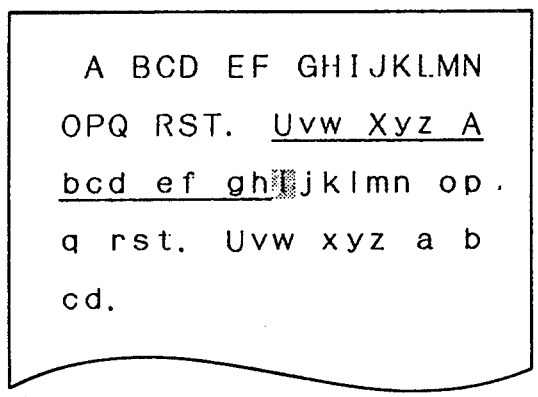
Figure 5C:
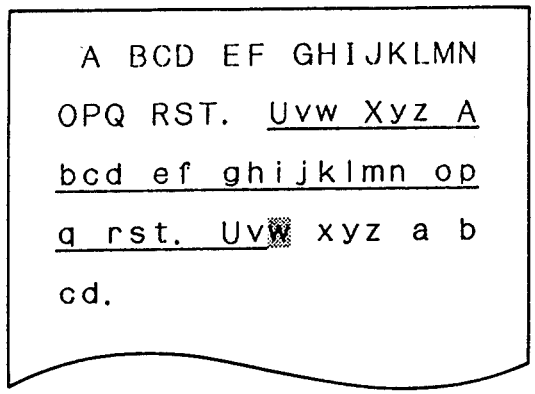
Figure 5D:
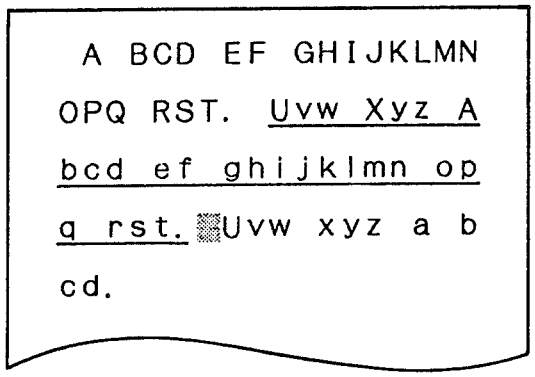

With reference to FIGS. 4A and 4B, a process of canceling the attribute effect, i.e., subscript in this example, will be explained more in detail. The attribute mode is set for subscript and the letters "CDEF" and "KHLMNO" in FIG. 4A are located lower than the other letters at normal level due to the subscript effect. The operator moves the cursor by the leftward cursor 35L from the letter "M" to the letter "D" so that the subscript effects are canceled within a range between the initial point and the terminal point of the cursor, that is, between the letter "M" and the letter "D" in FIGS.

4A and 4B. According to the present embodiment, neither the leftward nor upward movement of the cursor affects the attribute flags which are already reset. Therefore, the characters where the attribute flags have been reset are displayed in the same state even after the cursor passes them so as to cancel the attribute effect, a illustrated by the letters "GHIJ" at normal level in FIGS. 4A and 4B.

As described above, the word processor of the present embodiment can easily produce and cancel the attribute effects selected by the attribute effect keys in response to the cursor keys 35R, 35U, 35L and 35D. As a result, it requires only a few keystrokes for the attribute function. Since the rightward cursor key 35R and the downward cursor key 35D are used to produce the attribute effects while the leftward cursor key 35L and the upward cursor key 35U are used to cancel the attribute effects, the present invention makes it extremely easy, particularly, to correct undesired attribute effects in the text.

With respect to the above-stated advantages of the embodiment, FIGS. 5A through 5D illustrate a simple method of underlining through a wide range by the combination of the downward cursor key 35D and the leftward cursor key 35L. In order to underline from the letter "U" on the second line to the period "." on the fourth line, the operator first moves the cursor down two positions from the letter "U" to the letter "w" by depressing the downward cursor key 35D twice so that the underline extends from the letter "U" to the letter "w", and then moves the cursor leftward by depressing the leftward cursor key 35L thrice so that the under line is canceled from the letter "w" to the space after the period ".". As a result, only five keystrokes on the cursor keys are required so as to underline through such a wide range.

In the above-stated first embodiment, the word processor is designed for editing the English text. However, the embodiment may be applied to a Japanese word processor within the scope of the appended claims. Furthermore, the word processor may employ a method of identifying the location requiring the attribute effect by means of control codes instead of attribute flags.

Hereinafter a second embodiment of the present invention will be described with reference to the drawings.

Figure 6:
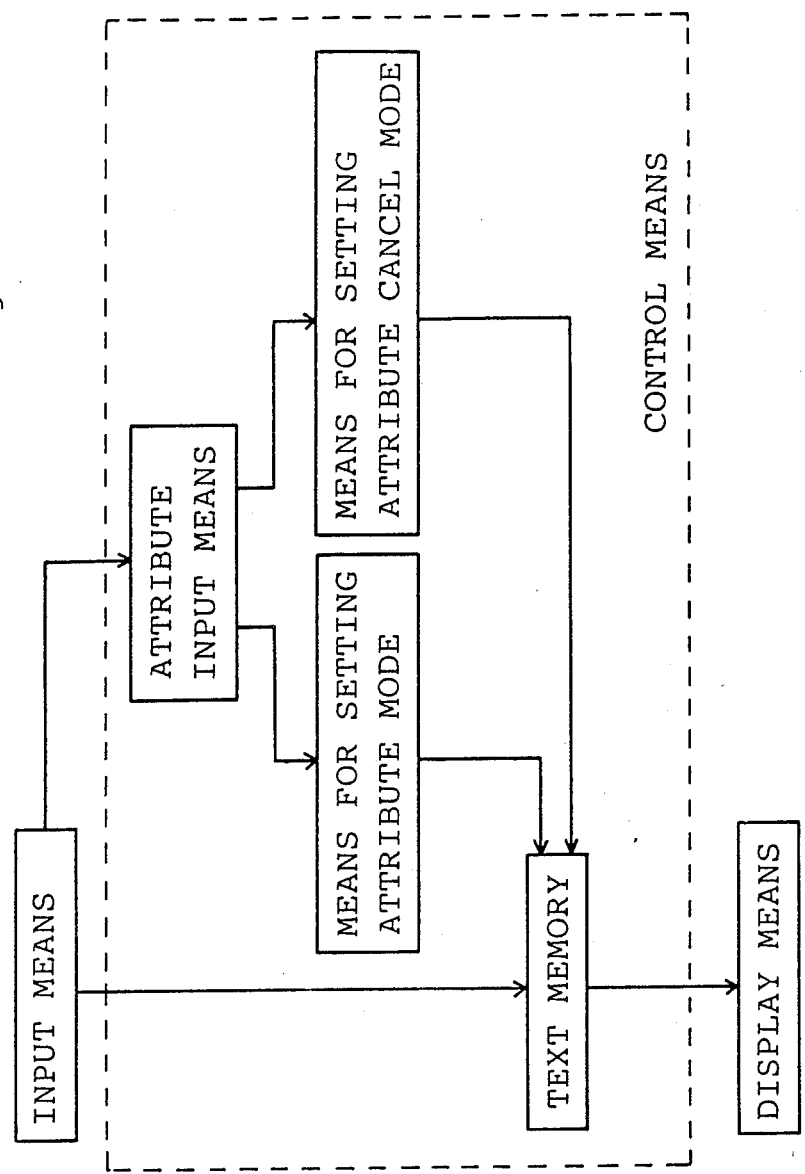
FIG. 6 is a schematic block diagram of a second embodiment of the invention.

As illustrated by a block diagram in FIG. 6, the word processor of the second embodiment mainly comprises input means, display means, and a control means having a text memory.

The second embodiment applies the present invention to a word processor having an attribute mode and an attribute cancel mode. The attribute mode is selected in order to produce the attribute effects according to the cursor's movement while the attribute cancel mode is selected in order to cancel the attribute effects.

Figure 7:
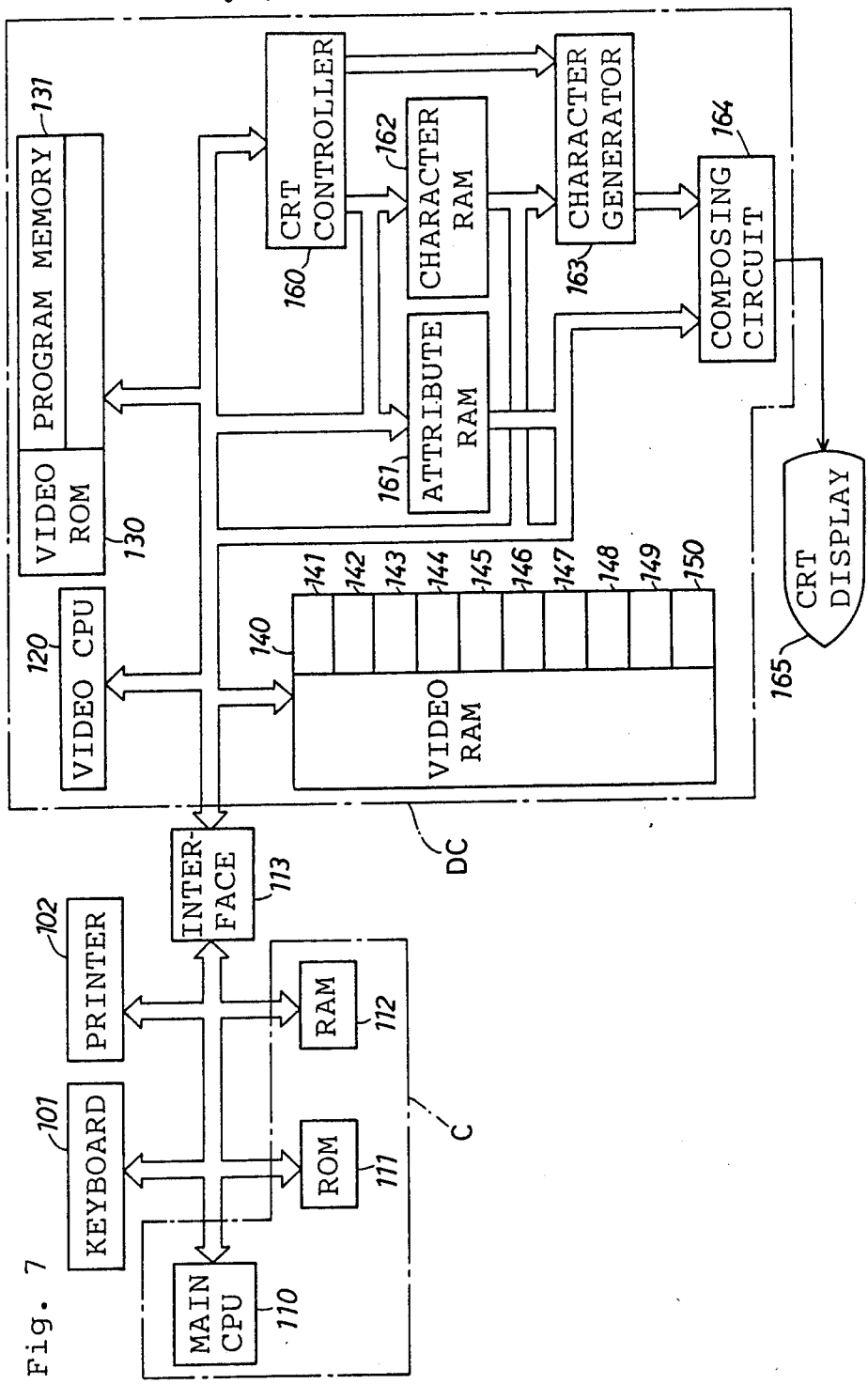
FIG. 7 is a block diagram of a control system of the second embodiment.

With reference to FIG. 7, the word processor mainly comprises a keyboard 101, a printer 102, a control system C and a display device which will be described later.

The keyboard 101 is provided with various character keys, such as alphabet keys, number keys, and symbol keys; and various function keys, such as cursor keys to move a cursor on a CRT display 165 of the display device, a return key to return from one line to another, attribute effect keys such as an underline key, a boldface key, a superscript key, a subscript key and a strikeout key, and an attribute cancel key to set the attribute cancel mode. Those attribute effect keys and the attribute cancel key are ON/OFF keys, each having a lamp which is turned on during the ON-state.

The printer 102 mainly comprises a carriage mechanism, a forms feed mechanism, a print wheel, and a print hammer, each having a drive motor (or a drive solenoid) and a drive circuit.

The control system C comprises a main CPU 110, a ROM 111, and a RAM 112. The main CPU 110 is connected with the drive circuits of the keyboard 101 and of the printer 102, with the ROM 111, and with the RAM 112 via a data bus or an address bus.

The RAM 112 comprises a plurality of text memories storing plural file data and various memories storing temporarily the results processed by the main CPU 110.

The ROM 111 stores a print control program for controlling the printer 102, a memory control program for controlling the memories in the RAM 112, and a decoder program for determining if a code data input from the keyboard 101 is a character data or a command data and for decoding the command data.

According to the programs in the ROM 111, the main CPU 110 outputs a code data to the display control system DC via an interface 113. Receiving a print command, the main CPU 110 reads the appropriate file data one after another from the text memory in the RAM 112 so as to output them to the printer 102. Furthermore, the main CPU 110 writes the file data, which are made in the display control system DC, in the text memory in the RAM 112; or the main CPU 110 outputs the file data in the RAM 112 to the display control system DC.

The display device consists of the display control system DC and the CRT display 165. The display control system DC comprises a video CPU 120, a video RAM 140 connected with the video CPU 120 via the data bus or the address bus, a video ROM 130, a CRT controller 160, an attribute RAM 161, a character RAM 162, a character generator 163, and a composing circuit 164.

The video RAM 140 comprises a text memory 141, a line buffer 142, a cursor column memory 143, a cursor line memory 144, an underline mode flag memory 145, a boldface mode flag memory 146, a superscript mode flag memory 147, a subscript mode flag memory 148, a strikeout mode flag memory 149, an attribute cancel mode flag memory 150, and other memories storing temporally the results processed by the video CPU 120. In the text memory 141, the file data in the process of being made or the file data read from the RAM 112 are written. In the line buffer 142, a line data is written from the text memory 141. The line data identifies a current line which includes a cursor and is being edited on the CRT display 165. The cursor column memory 143 stores a cursor column data corresponding to the cursor's current position out of the line buffer 142. A cursor line memory 144 stores the location of the line data in the line buffer 142 relative to the file data stored in the text memory 141. The underline mode flag memory 145 stores an underline mode flag in response to pressing of the underline key. The boldface mode flag memory 146, the superscript mode flag memory 147, the subscript mode flag memory 148, the strikeout mode flag memory 149, and the attribute cancel mode flag memory 150 store their respective flags in the same manner as the underline mode flag memory 145.

The program memory 131 in the video ROM 130 is provided with: a cursor movement control program for controlling the writing of the data in the line buffer 142 according to the pressing of the cursor keys or the character keys; a control program for the CRT controller 160; a control program for controlling an input process of the data from the main CPU 110 or an edit process of the file data in the text memory 141; and a control program for controlling a process for setting attribute effects which will be described later.

The character RAM 162 stores code data of the characters presently displayed on the CRT display 165 in such a manner that the arrangement of the stored code data corresponds to that of the displayed characters on the CRT display 165. When the code data stored in the character RAM 162 are provided with any attribute effect, the attribute RAM 161 stores attribute data (e.g., underline, boldface etc.) corresponding to the memory address stored in the character RAM 162.

The character generator 163 stores approximately four hundred kinds of display data corresponding to the code data so as to display characters on the CRT display 165. Each display data has a dot pattern made of sixteen dots in length and eight dots in width and expressed by sixteen bytes. The composing circuit 164 composes the display data output from the character generator 163 and the attribute data output from the attribute RAM 161.

The video CPU 120 displays the file data read from the text memory 141 according to the command data. Furthermore, the video CPU 120 writes the code data, which are output from the main CPU 110 via the interface 113, on the cursor's position in the line buffer 142 in the video RAM 140. The video CPU 120 simultaneously executes the input and edit process, writing the above-mentioned code data on each address in the character RAM 162 and the attribute RAM 161 corresponding to the address in the line buffer 142. Still furthermore, the video CPU 120 controls the cursor's movement by indicating the cursor's address to the CRT controller 160.

The CRT controller 160 controls the display of data on the CRT display 165 in synchrony with a raster signal. In detail, the CRT controller 160 controls the composing circuit 164 to compose the display data from the character generator 163 and the attribute data from the attribute RAM 161 so as to output the composed data to the CRT display 165. The CRT controller 160 also controls the cursor display such as displaying in reverse the character on which the cursor is located.

The second embodiment of the present invention is provided with the attribute mode for producing the attribute effects and the attribute cancel mode for canceling the attribute effects. Hereinafter an outline of a process for the attribute effects will be described with reference to the drawings.

In the text memory 141 in the video RAM 140, an ON code and an OFF code of the attribute effects are written before and after the character code.

In the line buffer 142, two bytes provide for one character according to the data in the text memory 141. Each of the eight bits in the upper byte is used as an attribute flag identifying a type of attribute effect. The correspondence between the bits and the attribute effects is the same as that of the first embodiment shown in TABLE 1. In response to setting or resetting of the flag in the line buffer 142, the corresponding data in the attribute RAM 161 is altered.

FIG. 8 illustrates a process of producing and canceling the underline effect. In the first example (a) thereof, the numerals "2", "4", "5", and "7" are underlined while the numerals "3", "4", "7" and "8" are displayed in boldface. If the operator first depresses the underline key so as to set the attribute mode, i.e., the underline mode, and then moves the cursor rightward from the numeral "1" to the space next to the numeral "4", each numeral between "1" and "4" is underlined as shown in the second example (b). Thereafter, if the operator depresses the attribute cancel key so as to set the attribute cancel mode and then moves the cursor rightward to the space next to the numeral "8", the underline which has been previously produced is canceled between the numerals "5" and "8", as shown in the third example (c).

Next, FIG. 9 illustrates a process of producing and canceling the underline effect as well as the boldface effect. In the first example (a) thereof, the operator first depresses the underline key and the boldface key so as to set the attribute modes, i.e., the underline mode and the boldface mode, and then moves the cursor rightward from the numeral "1" to the space next to the numeral "4". As a result, each numeral between the numerals "1" and "4" is underlined and displayed in boldface as shown in the second example (b). Thereafter, if the operator depresses the attribute cancel key and then moves the cursor rightward to the space next to the numeral "8", the underline and the boldface effect which have been previously produced are canceled between the numerals "5" and "8", as shown in the third example (c).

FIG. 10 illustrates a process of producing and canceling the boldface effect. In the first example (a) thereof, the operator depresses the boldface key to set the attribute mode, i.e., the boldface mode, and then moves the cursor rightward from the numeral "1" to the space next to the numeral "4". As a result, each numeral between the numerals "1" and "4" is displayed in boldface as shown in the second example (b). Thereafter, if the operator depresses the attribute cancel key and then moves the cursor rightward to the space next to the numeral "8", the boldface effect is canceled between the numerals "5" and "8", as shown in the third example (c).

FIG. 11 illustrates especially the cursor's movement. In the first example (a) thereof, the operator moves the cursor rightward without depressing any attribute effect key. In this case, the cursor's movement does not produce or cancel the attribute effects on the characters as shown in the second example (b). Thereafter, the operator depresses the attribute cancel key and moves the cursor rightward. In this case, the cursor's movement does not produce or cancel the attribute effects, either, as shown in the third example (c). In other words, the attribute cancel mode for canceling an attribute effect can be set by the functional cooperation of the attribute effect key and the attribute cancel key.

FIGS. 12A, 12B and 12C illustrate a process of producing the underline according to the vertical movement of the cursor. If the operator depresses the underline key and then moves the cursor from the letter "i" on the third line in FIG. 12A down one position to the letter "W", the underline is drawn between the letter "i" on the third line and the letter "V" on the fourth line, as shown in FIG. 12B. On the other hand, if the operator depresses the underline key and then moves the cursor from the letter "i" in FIG. 12A up one position to the letter "U", the underline is drawn between the letter "U" on the second line and the letter "h" on the third line, as shown in FIG. 12C.

With respect to FIGS. 13A through 15B, we will now describe the routine for the process controlling the attribute effects executed by the display control system DC. When the word processor is turned on, the routine starts and initialization, such as resetting the attribute cancel flag, is executed at step 1 in FIG. 13A. At the subsequent step 2, a decision is made of whether a keystroke was made or not. This decision at step 2 is repeated every minute time interval until a keystroke is detected, and thereafter the routine proceeds to step 3.

At steps 3 through 6, the underline mode is set or reset. More particularly, at step 3, a decision is made of whether the keystroke was made on the underline key or not. If not, the routine jumps to step 7; if so, on the other hand, the routine proceeds to step 4. At step 4, a decision is made of whether the underline mode flag is set or not according to the data in the underline mode flag memory 145 in the video RAM 140. If the answer is YES at step 4, the routine proceeds to step 5 where the underline mode flag is reset so as to reset the underline mode and the lamp (LED) indicating the underline mode is turned off. Thereafter, the routine loops back to step 2. If the underline mode flag is not set, on the other hand, the routine proceeds from step 4 to step 6 where the underline mode flag is set so as to set the underline mode and the LED indicating the underline mode is turned on. Thereafter the routine loops back to step 2.

Figure 13A:
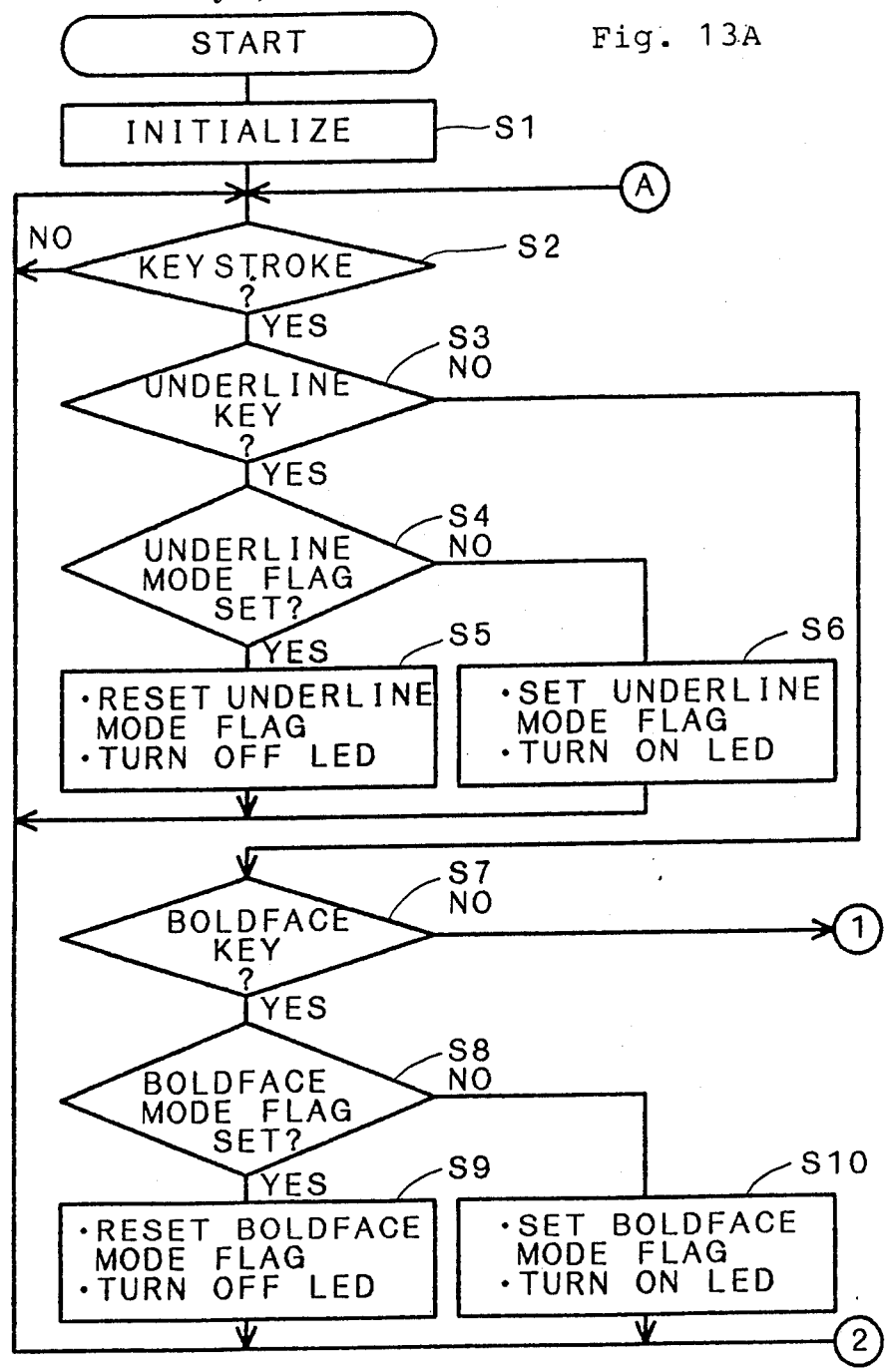
FIGS. 13A, 13B, 13C, 14, 15A and 15B are flowcharts of an attribute mode control routine of the second embodiment.
Figure 13B:
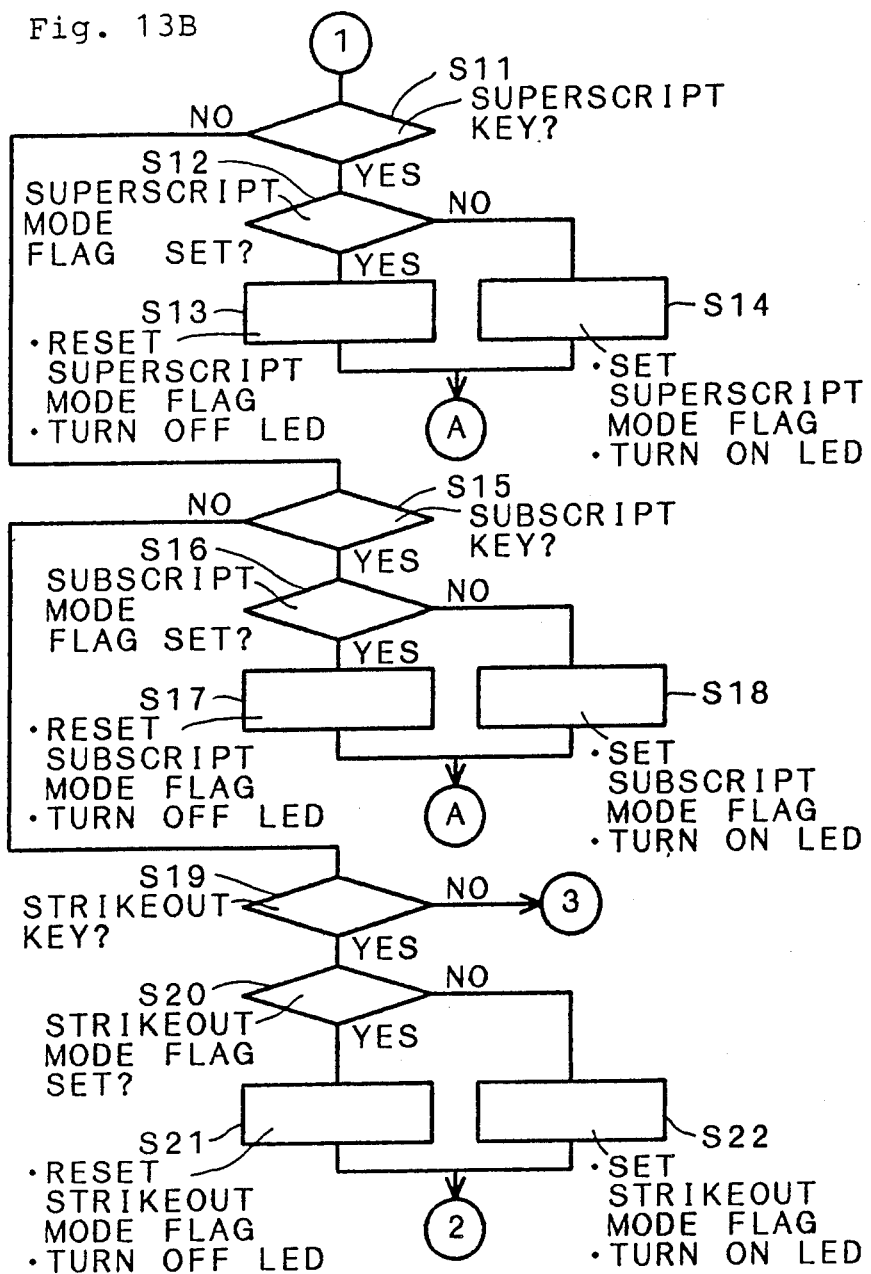

In the same manner as the above-stated process of setting or resetting the underline mode at steps 3 through 6, the boldface mode, the superscript mode, the subscript mode, and the strikeout mode are set or reset at steps 7 through 10 in FIG. 13A, at steps 11 through 14 in FIG. 13B, at steps 15 through 18 and at steps 19 through 22 respectively, in response to their respective attribute effect keys.

Figure 13C:
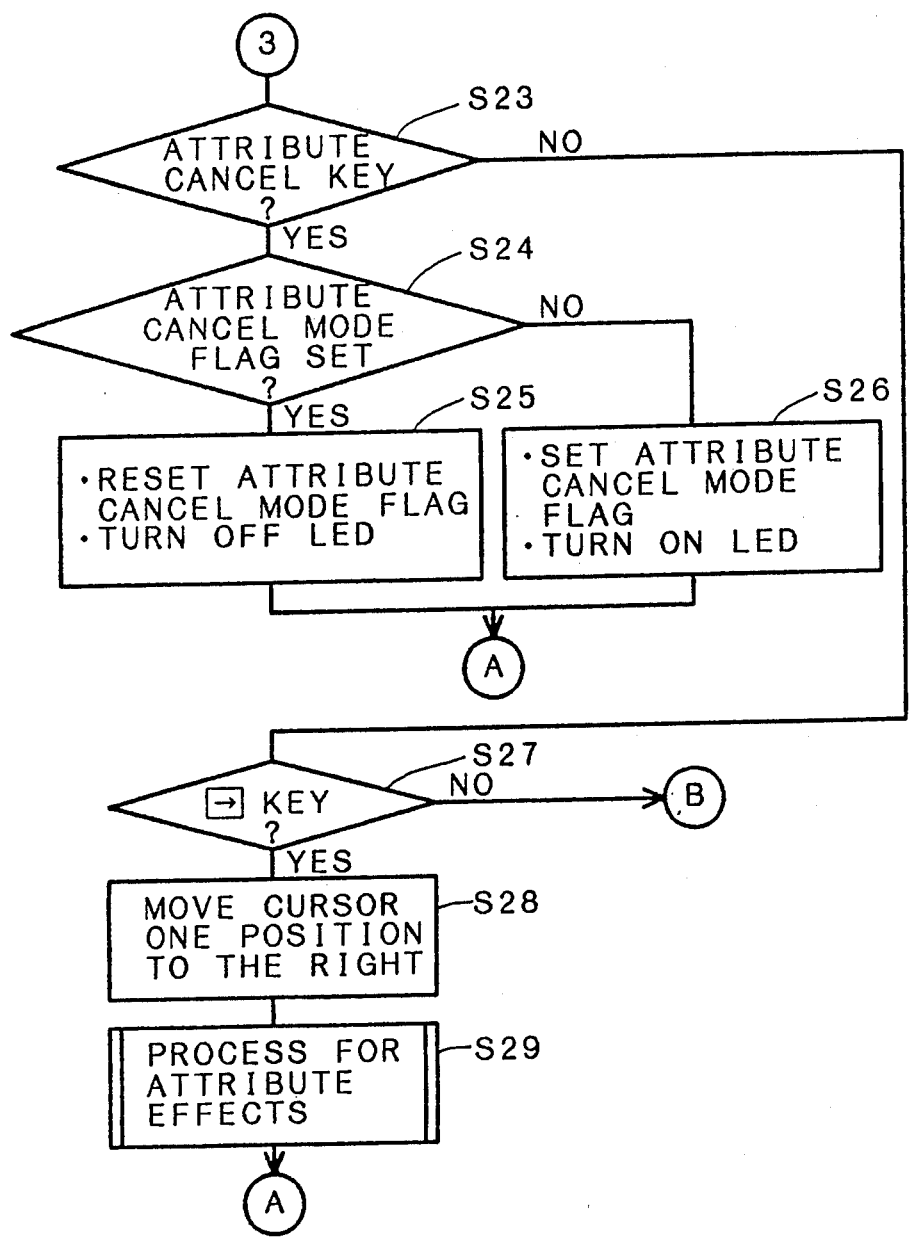

When it is determined after the steps 3 through 19 that none of those attribute effects keys was depressed, the routine proceeds to step 23 in FIG. 13C where a decision is made of whether the keystroke detected at step 2 was made on the attribute cancel key or not. If it was, the routine proceeds to step 24 where a decision is made of whether the attribute cancel mode flag is set or not. If so, the attribute cancel mode flag is reset and the LED indicating the attribute cancel mode is turned off at step 25. If the attribute cancel mode flag is not set, on the other hand, the attribute cancel mode flag is set and the LED is turned on at step 26.

When it is determined at step 23 that the attribute cancel key is not depressed, the routine jumps to step 27. At step 27, a decision is made of whether the keystroke was made on the rightward cursor key or not. If not, the routine proceeds to step 30 in FIG. 14; if so, on the other hand, the routine proceeds to step 28 where the cursor is moved to the next position and accordingly the video CPU 120 adds 1 to the value of the cursor column memory 143.

Figure 15A:
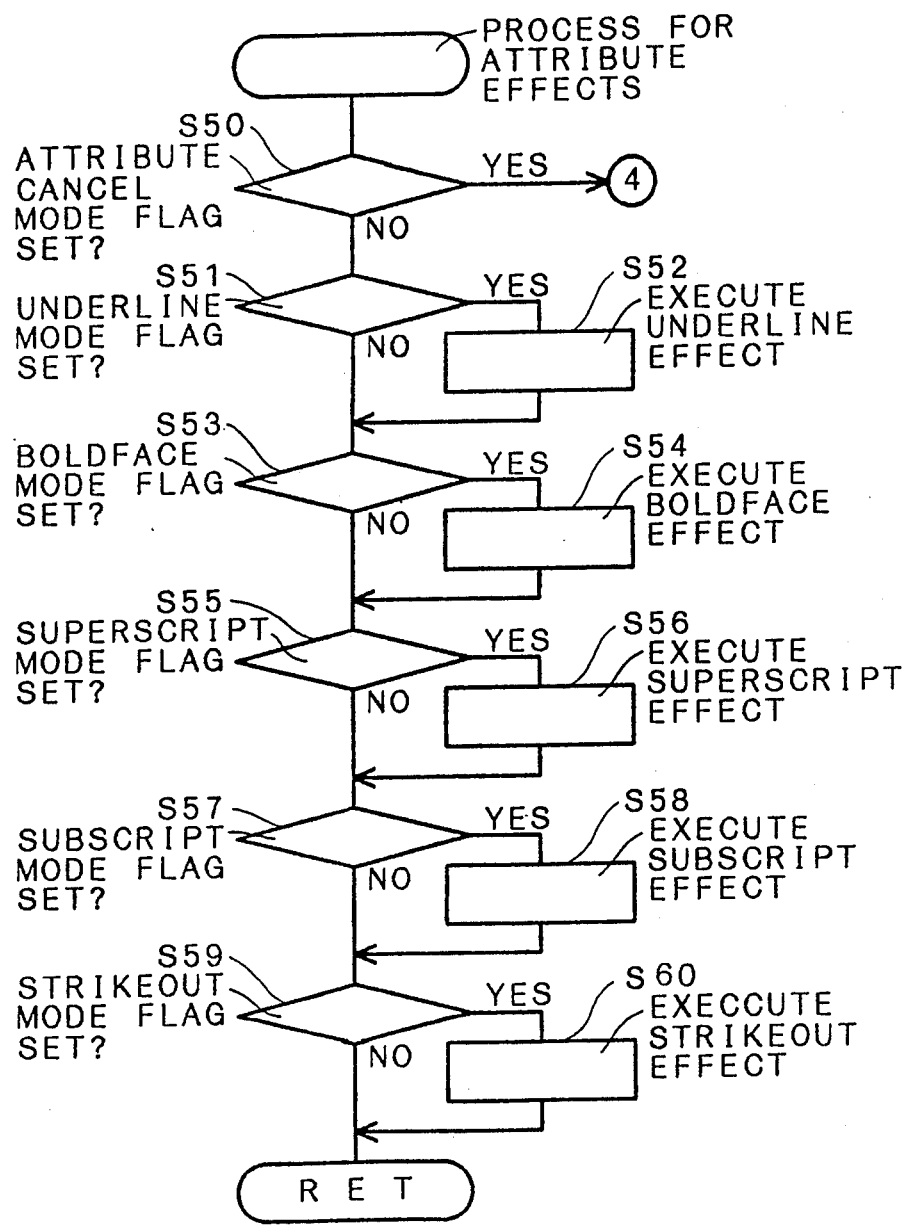

The process for attribute effects at subsequent step 29 will now be described in detail with reference to the flowchart in FIGS. 15A and 15B.

At step 50 a decision is made of whether the attribute cancel mode flag is set or not. If not, that is, if the present mode is the attribute mode instead of the attribute cancel mode, the routine goes to step 51. At step 51, a decision is made of whether the underline mode flag is set or not. If the answer is NO, the routine proceeds to step 53; if YES at step 51, on the other hand, the characters are underlined on the display at step 52 in response to the cursor's movement, and thereafter the routine proceeds to step 53. Furthermore, at step 52, the $2^0$ bit on each character code of the underlined characters is set to 1 in the line buffer 142. In order to display the attribute effect on the CRT display 165, those eight-bit attribute data set in the line buffer 145 are written on the corresponding addresses of the characters in the attribute RAM 161.

In the same manner as the above-stated routine from step 50 to step 52, the other attribute effects, i.e., boldface, superscript, subscript, and strikeout effects, are executed when their respective mode flags are detected at the subsequent steps 53 through 60. At the same time, the attribute data, shown in TABLE 1, are written in the line buffer 142 and the attribute RAM 161 so as to display on the CRT display 165. The process for the attribute effects ends here and the routine returns to step 2 in FIG. 13A.

Figure 15B:
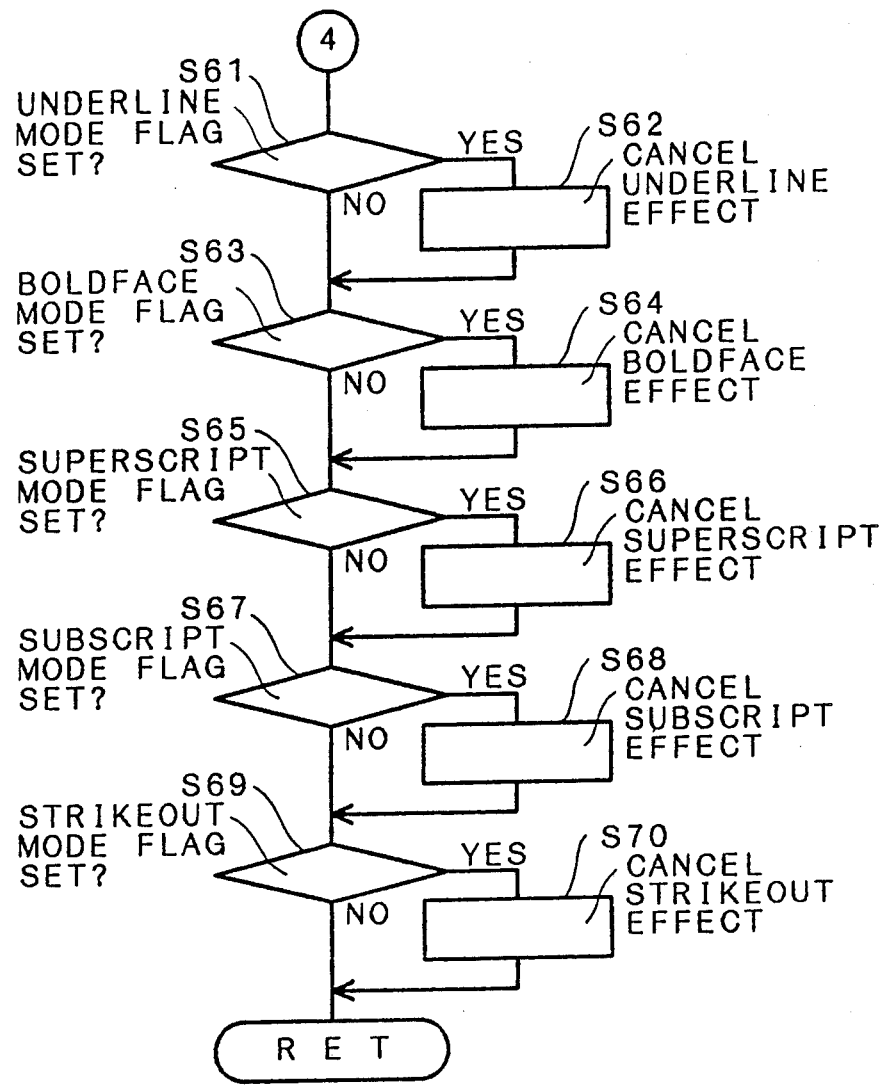

On the other hand, if the answer at step 50 is YES, that is, if the present mode is the attribute cancel mode instead of the attribute mode, the routine jumps to step 61 in FIG. 15B. At step 61 a decision is made if the underline mode flag is set or not. If the answer is NO, the routine goes to step 63; if YES, the underline effect is canceled in response to the cursor's movement at step 62 before the routine goes to step 63. Furthermore, at step 62, the $2^0$ bit on each corresponding character code is reset to 0.

In the same manner as the above-stated routine for canceling the underline effect, the other attribute effects, i.e., boldface, superscript, subscript and strikeout, are canceled when their respective mode flags are detected at the subsequent steps 63 through 70. At the same time, the attribute data are written in the line buffer 142 and the attribute RAM 161 to cancel the attribute effects which have been displayed on the CRT display 165. The process for the attribute effects ends here and the routine returns to step 2 in FIG. 13A.

Figure 14:
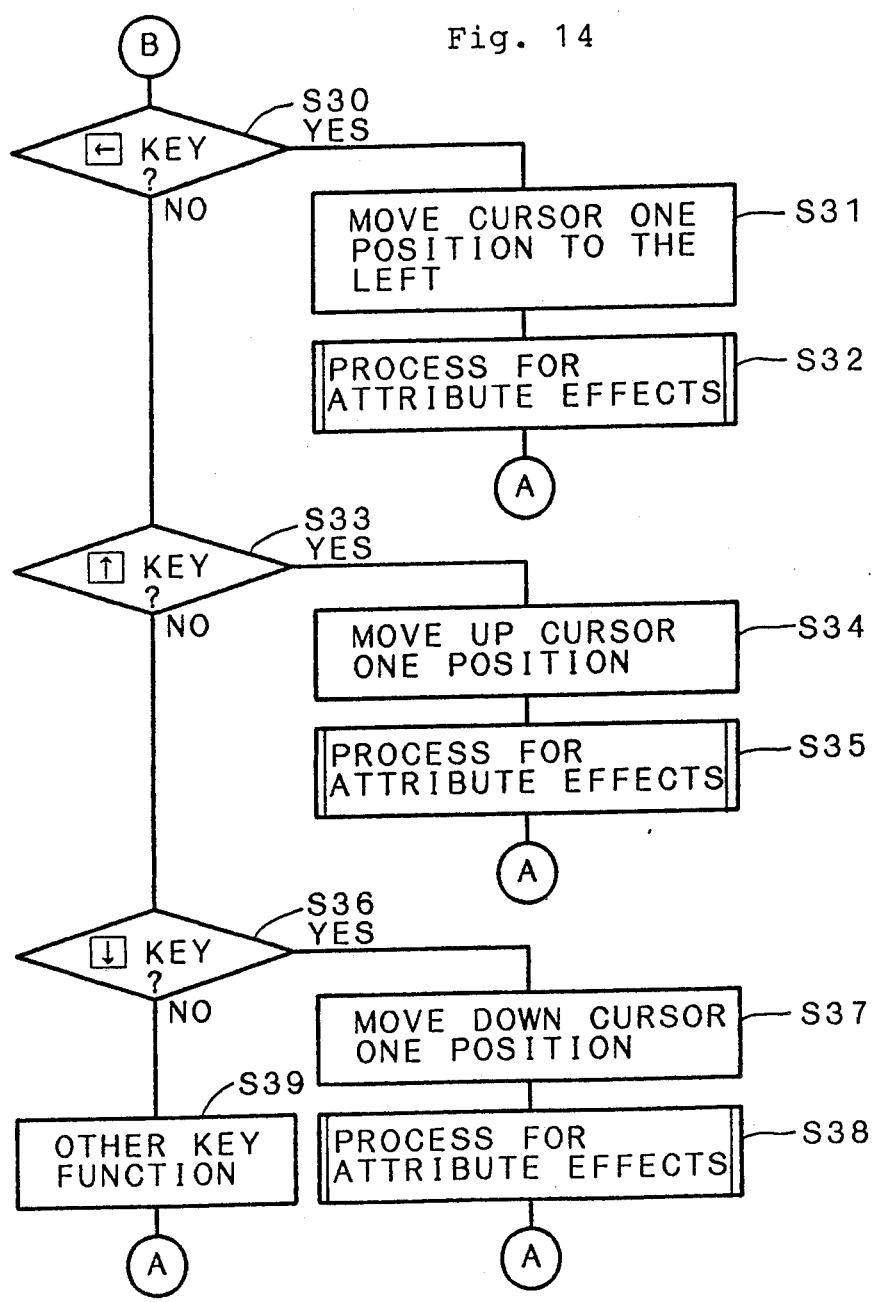

With respect to FIG. 14, at step 30 resulting from the answer NO at step 29 in FIG. 13C, a decision is made of whether the keystroke was made on the leftward cursor key or not. If the answer is NO, the routine proceeds to step 33; if the answer is YES, the cursor is moved back to the preceding position at step 34 and accordingly the video CPU 120 substracts 1 from the value in the cursor column memory 143. The process for attribute effects at step 32 is similar to the above-stated process at step 29. Thereafter the routine returns to step 2 in FIG. 13A.

Similarly to the routine at steps 30 through 32, at steps 33 through 38 the cursor is moved upward or downward in response to their respective cursor keys and then the process for attribute effects is executed. If it is finally determined that the keystroke was not made on any cursor keys, the routine proceeds to step 39 where the characters are input in response to pressing of the character keys or the other functions are executed in response to pressing of the function keys. After step 39, the program returns to step 2 in FIG. 13A.

Obviously, many modifications and variations of the present invention are possible with regard to the above teachings. It is therefore to be understood that within the scope of the appended claims, the invention may practiced other than as specifically described.

What is claimed is:

1. A word processor comprising:
   input means having at least a character key for inputting character data and two or more cursor keys for inputting cursor position data, said cursor keys including a first cursor key group for providing an attribute and a second cursor key group for deleting an attribute;

display means responsive to the input means for displaying a character corresponding to the character data and a cursor corresponding to the cursor position data;

attribute selection means having an attribute selection key for selecting attribute data;

control means, responsive to the attribute selection means and to a cursor key of the first cursor key group, for adding an attribute to a character within a display range and for adding the attribute data to the character data in the memory means in response to cursor movement controlled by cursor position data input by the key of the first cursor key group, the display range being delimited by an initial position of the cursor prior to its movement and a final position of the cursor after its movement in a predetermined direction, the initial position being the cursor position when the attribute selection means selects the attribute data; and deletion means, responsive to the attribute selection means and a key of the second cursor key group, for deleting an attribute from a character that has the attribute within the display range in response to the cursor movement controlled by cursor position data input by the key of the second cursor key group, the display range being delimited by an initial position of the cursor prior to its movement and a final position of the cursor after its movement in a direction opposite to the predetermined direction, the initial position being the cursor position when the attribute selection means selects the attribute data.

2. The word processor according to claim 1, wherein the predetermined direction is rightward and downward.

3. The word processor according to claim 1, wherein the opposite direction is leftward and upward.

4. The word processor according to claim 1, wherein the attribute data is selected from the group consisting of underline, boldface, strikeout, superscript and subscript.

5. The word processor according to claim 1, wherein the character data comprises plural bits with at least one bit being reserved for attribute data, each attribute bit being set in order to add the attribute data to the character data and being reset in order to delete the attribute data from the character data.

6. The word processor according to claim 1, wherein attribute control codes surround a queue of characters so as to determine a range of characters in which the attribute data are to be provided.

7. The word processor according to claim 1, in which the character with the attribute added is displayed on said display means as it is with that attribute.

8. A word processor comprising:
input means having at least a character key for inputting character data and a cursor key for inputting cursor position data;
memory means for storing the character data and the cursor position data from the input means;
display means reponsive to the input means for displaying a character corresponding to the character data and a cursor corresponding to the cursor position data;
mode setting means having a mode setting key for setting an attribute addition mode and a mode deletion key for setting an attribute deletion mode;
attribute selection means having an attribute selection key for selecting an attribute data; and
control means, responsive to the mode setting means, the attribute selection means, and to the cursor key, for adding an attribute to a character within a display range and adding the attribute data to the character data in the memory means in response to cursor movement controlled by the cursor position data in the attribute addition mode, and for deleting an attribute from a character that has the attribute within the display range and deleting the attribute data from the character data in the memory means in response to cursor movement controlled by the cursor position data in the attribute deletion mode, wherein the display range is delimited by an initial position of the cursor prior to its movement and a final position of the cursor after its movement in a predetermined direction, the initial position being the cursor position when the attribute mode is set and the attribute data is selected using the attribute selection means, and said control means can add or delete two or more attributes simultaneously within the display region determined by the initial and final positions.

9. The word processor according to claim 8, wherein the cursor moves upward, downward, leftward, and rightward.

10. The word processor according to claim 8, wherein the attribute data is selected from the group consisting of underline, boldface, strikeout, superscript and subscript.

11. The word processor according to claim 8, wherein the character data comprises plural bits with at least one bit being reserved for attribute data, each attribute bit being set in order to add attribute data to the character data and being reset in order to delete attribute data from the character data.

12. The word processor according to claim 8, in which attribute control does surround a queue of characters so as to determine a range of characters in which the attribute data are to be provided.

13. The word processor according to claim 8, in which the character with the attribute added is displayed on said display means as it is with that attribute.

14. A word processor comprising:
input means having at least a character key for inputting character data and a plurality of cursor key means for inputting cursor position data;
memory means for storing the character data and the cursor position data from the input means;
display means responsive to the input means for displaying a character corresponding to the character data and a cursor corresponding to the cursor position data;
attribute selection means having an attribute selection key for selecting attribute data;
control means, responsive to the attribute selection means and to one of the plurality of cursor key means, for adding an attribute data to a character within a display region and for adding the attribute data to the character data in the memory means in response to at least one of rightward and downward cursor movement controlled by the cursor position data; and deletion means, responsive to the attribute selection means and one of the plurality of cursor key means, for deleting an attribute from a character that has the attribute within the display range in response to at least one of leftward and upward cursor movement, the display range being delimited by an initial position of the cursor prior to its movement and a final position of the cursor after its movement in one of the above directions, the initial position being the cursor position when the attribute selection means selects the attribute data.

15. The word processor according to claim 14, wherein only characters in the state of attribute addition can be changed to a state of attribute deletion within a region of attribute deletion.

* * * * *